(12) United States Patent
Oh et al.

(10) Patent No.: US 7,280,171 B2
(45) Date of Patent: Oct. 9, 2007

(54) LIQUID CRYSTAL DISPLAY MODULE

(75) Inventors: Jeong-Seok Oh, Seoul (KR); Kyu-Seok Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/139,757

(22) Filed: May 2, 2002

(65) Prior Publication Data

US 2003/0098936 A1     May 29, 2003

(30) Foreign Application Priority Data

Nov. 23, 2001   (KR) ............................... 2001-73173

(51) Int. Cl.
*G02F 1/1335*   (2006.01)
(52) U.S. Cl. ......................... 349/65; 362/615
(58) Field of Classification Search ................. 349/65, 349/62, 64, 57; 362/606, 615, 617
See application file for complete search history.

(56) References Cited

U.S. PATENT DOCUMENTS

| | | | | |
|---|---|---|---|---|
| 5,711,589 | A * | 1/1998 | Oe et al. ........................ | 362/31 |
| 6,099,134 | A * | 8/2000 | Taniguchi et al. ........... | 362/618 |
| 6,241,903 | B1 * | 6/2001 | Savant et al. ................. | 216/24 |
| 6,425,673 | B1 * | 7/2002 | Suga et al. .................... | 362/31 |
| 6,556,258 | B1 * | 4/2003 | Yoshida et al. ............... | 349/61 |
| 6,568,819 | B1 * | 5/2003 | Yamazaki et al. ............ | 362/31 |
| 2003/0231265 | A1 * | 12/2003 | Yamazaki et al. ............ | 349/65 |

FOREIGN PATENT DOCUMENTS

| | | |
|---|---|---|
| CN | 1266478 A | 9/2000 |
| JP | 06324205 | 11/1994 |
| JP | 10048429 | 2/1998 |
| JP | 11-352312 | 12/1999 |
| JP | 2000056137 | 2/2000 |

* cited by examiner

*Primary Examiner*—Thoi V. Duong
(74) *Attorney, Agent, or Firm*—Cantor Colburn LLP (57) ABSTRACT

Disclosed is a liquid crystal display module having a reduced thickness thereof. A light exit surface of a light guiding plate for converting a linear light source output from the lamp in the form of planar light source is non-planarized with a plurality of convex portions having a desired height. A prism sheet for controlling a path of the light output from the light guiding plate is laid on the light guiding plate, as being opposite the plurality of convex portions. Accordingly, it is possible to uniformly control the brightness distribution of the light output from the light guiding plate without providing a separate diffusing plate between the light guiding plate and the prism sheet. In addition, since the plurality of convex portions which are formed integrally with the light guiding plate directly faces the prism sheet, adherence between the light guiding plate and the prism sheet can be prevented. Therefore, the diffusing plate can be eliminated from the liquid crystal display module, thereby reducing the number of components, and thus minimizing the thickness of the liquid crystal display module.

13 Claims, 8 Drawing Sheets

LIQUID CRYSTAL DISPLAY MODULE

BACKGROUND OF THE INVENTION

1. Field of the Invention

The present invention relates to a liquid crystal display device, and more particularly, to a liquid crystal display module having a reduced number of components to minimize a thickness thereof.

2. Description of the Related Art

Generally, there is needed a display device serving as an interface so that a user visually identifies the information processed by an information processing unit. A liquid crystal display shows full colors and has a high resolution. The liquid crystal display is lighter in weight and slimmer than a traditional cathode ray tube. As a result, the liquid crystal display is widely used as a monitor of a typical information processing unit, such as a computer, a domestic wall-mounted television receiver set, or the like.

Figure 1:
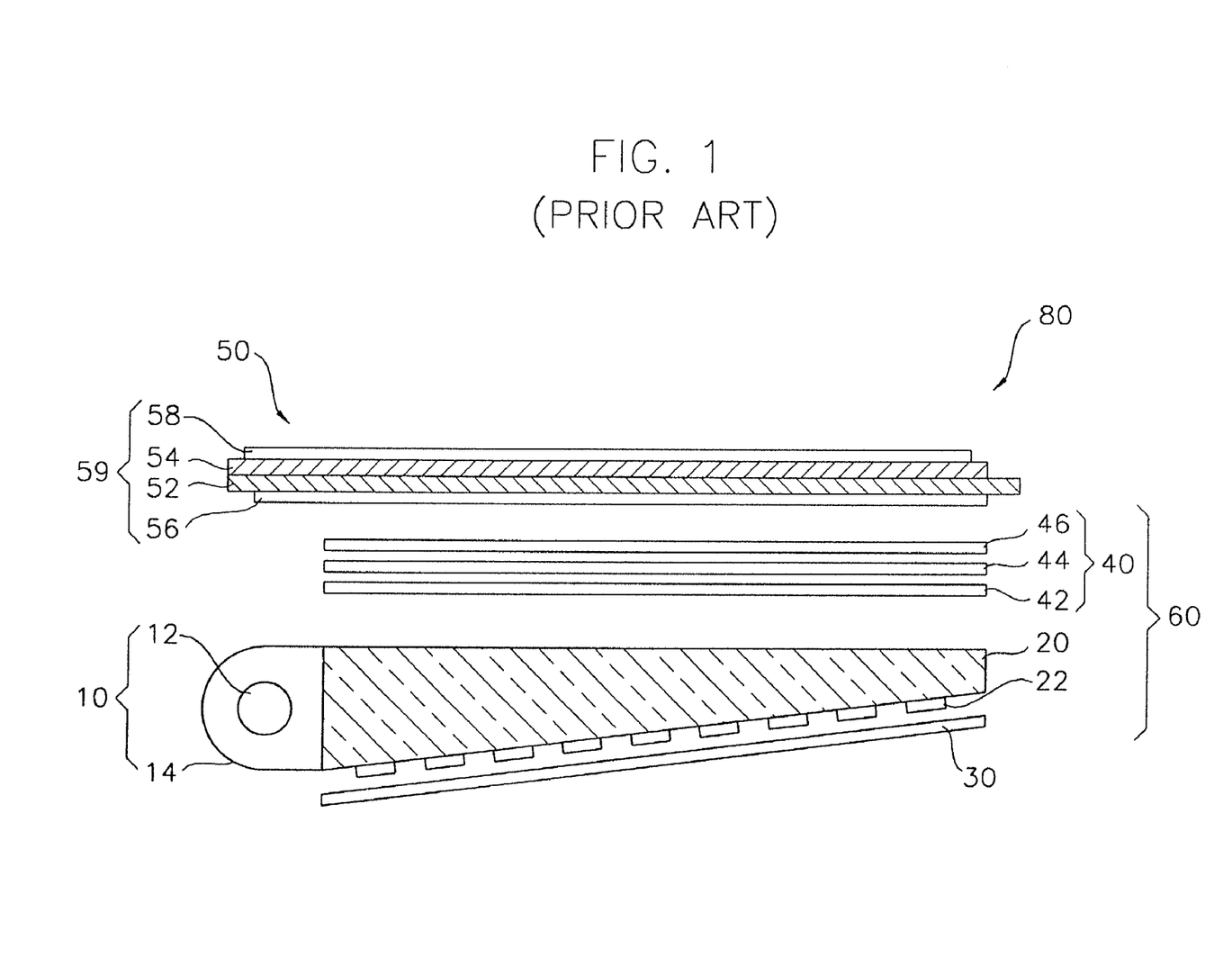
FIG. 1 is a cross sectional view illustrating the structure of a conventional liquid crystal display module.
Figure 2:
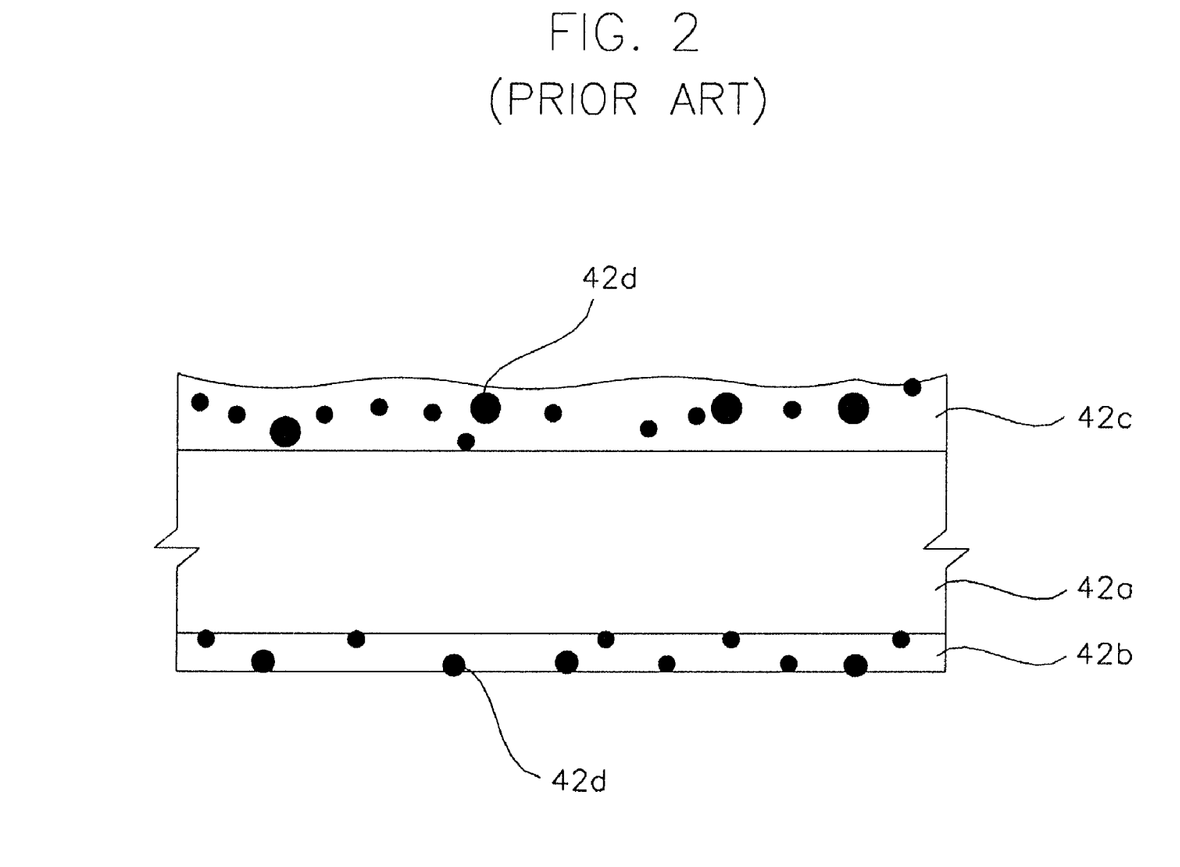
FIG. 2 is a cross sectional view illustrating a detailed structure of a diffusing plate shown in FIG. 1.

FIG. 1 is a sectional view illustrating the structure of a conventional liquid crystal display module, and FIG. 2 is a sectional view illustrating a detailed structure of a diffusing plate shown in FIG. 1.

As shown in FIG. 1, a liquid crystal display module 80 includes a display unit 50 having a liquid crystal display panel for displaying an image, and a backlight assembly 60 emitting a light to the display unit 50.

The display unit 50 includes a liquid crystal display panel 59, a data-and-gate printed circuit board (not shown), and a data-and-gate tape carrier package (not shown).

The liquid crystal display panel 59 includes a thin film transistor substrate 52, a color filter substrate 54, and liquid crystal (not shown) interposed between the thin film transistor substrate 52 and the color filter substrate 54.

The thin film transistor substrate 52 includes a transparent glass with a matrix-type thin film transistor formed therein, and the transistor includes a source terminal connected to a data line, a gate terminal connected to a gate line, and a drain terminal having a pixel electrode formed by depositing indium tin oxide (ITO) as a transparent conductive material thereon.

The color filter substrate 54 is provided so as to face the thin film transistor substrate 52, and is formed to have RGB pixels through a thin film forming technique. The RGB pixels are color pixels displaying a desired color when a light passes therethrough. A common electrode of ITO is applied on the entire surface of the color filter substrate 54.

If the thin film transistor 52 is turned on by applying a power to the gate and source terminals of the transistor, an electric field is generated between a pixel electrode and the common electrode of the color filter substrate. An alignment angle of the liquid crystal introduced between the thin film transistor substrate 52 and the color filter substrate 54 is changed by the electric field, and the change of the alignment angle changes the light transmittance, thereby providing a desired pixel.

A backlight assembly 60 is provided under the display unit 50 to uniformly illuminate the display unit 50 from a back surface side of the display unit 50. The backlight assembly includes a lamp unit 10 for generating a light, a light guiding plate 20 for guiding the light toward the display unit 50 and changing a path of the light, an optical sheet 40 for making uniform the brightness of the light illuminated from the light guiding plate 20, and a reflecting plate 30, positioned under the light guiding plate 20, for reflecting the light leaked from the light guiding plate 20 toward the light guiding plate 20 to enhance the light transmission efficiency.

The display unit 50 and the backlight assembly 60 are sequentially inserted into a mold frame (not shown) such as a receptacle, and a top chassis (not shown) is engaged against the mold frame in order to prevent the display unit 50 from being disengaged from the mold frame.

The optical sheet 40 includes a diffusing plate 42 for emitting the light from the light guiding plate 20 as a light having a uniform distribution of brightness, and first and second prism sheets 44 and 46 for controlling the light from the diffusing plate 42 in a different direction to secure a visual angle. In particular, the diffusing plate 42 includes a scattering agent to secure the uniform brightness distribution of light from the light guiding plate 20.

As shown in FIG. 2, the diffusing plate 42 includes a base layer 42a, and first and second diffusing surfaces 42b and 42c covering both surfaces of the base layer 42a. The first and second diffusing surfaces 42b and 42c are provided with a plurality of beads 42d to prevent the light guiding plate 20 from being closely adhered to the diffusing plate 42.

However, in order to improve the wide visual angle and brightness characteristics of the light guiding plate 20, the optical sheet 40 use additional components such as the diffusing plate 42, and the first and second prism sheets 44 and 46. Therefore, the manufacturing cost of the liquid crystal display module increases, and there is a limit in making the LCD module lighter, thinner, and smaller.

SUMMARY OF THE INVENTION

The present invention provides a liquid crystal display module having a reduced thickness thereof by reducing the number of components.

In one aspect, there is provided a liquid crystal display (LCD) module, in which a lamp generates a light. A light guiding plate guides the light output from the lamp. An optical sheet controls a path of the light output from the light guiding plate the light guiding plate includes a non-planarized light exit surface to prevent the light guiding plate from being adhered to the optical sheet.

The light exit surface of the light guiding plate includes a plurality of convex portions. The convex portion has a height of 0.68 μm to 1.6 μm.

The optical sheet includes at least one prism sheet for controlling the path of the light output from the light guiding plate. The prism sheet is adapted to make direct contact with the plurality of convex portions formed on the light exit surface of the light guiding plate.

A brightness at a light receiving surface of the light guiding plate into which the light is incident is from 600 to 1400 nit.

With the LCD module, it is possible to control the brightness distribution of the light output from the light guiding plate uniformly, without requiring a separate diffusing plate between the light guiding plate and the prism sheet.

In addition, since the plurality of convex portions which are integrally formed with the light guiding plate directly faces the prism sheet, the adherence between the light guiding plate and the prism sheet can be prevented. Therefore, the diffusing plate can be eliminated from the liquid crystal display module, thereby reducing the number of components, and thus minimizing the thickness of the liquid crystal display module.

BRIEF DESCRIPTION OF THE DRAWINGS

The above and other advantages of the present invention will become more apparent by describing in detail preferred embodiments thereof with reference to the attached drawings in which.

DETAILED DESCRIPTION OF THE INVENTION

Hereinafter, exemplary embodiment of the present invention will be described in detail with reference to the accompanying drawings.

Figure 3:
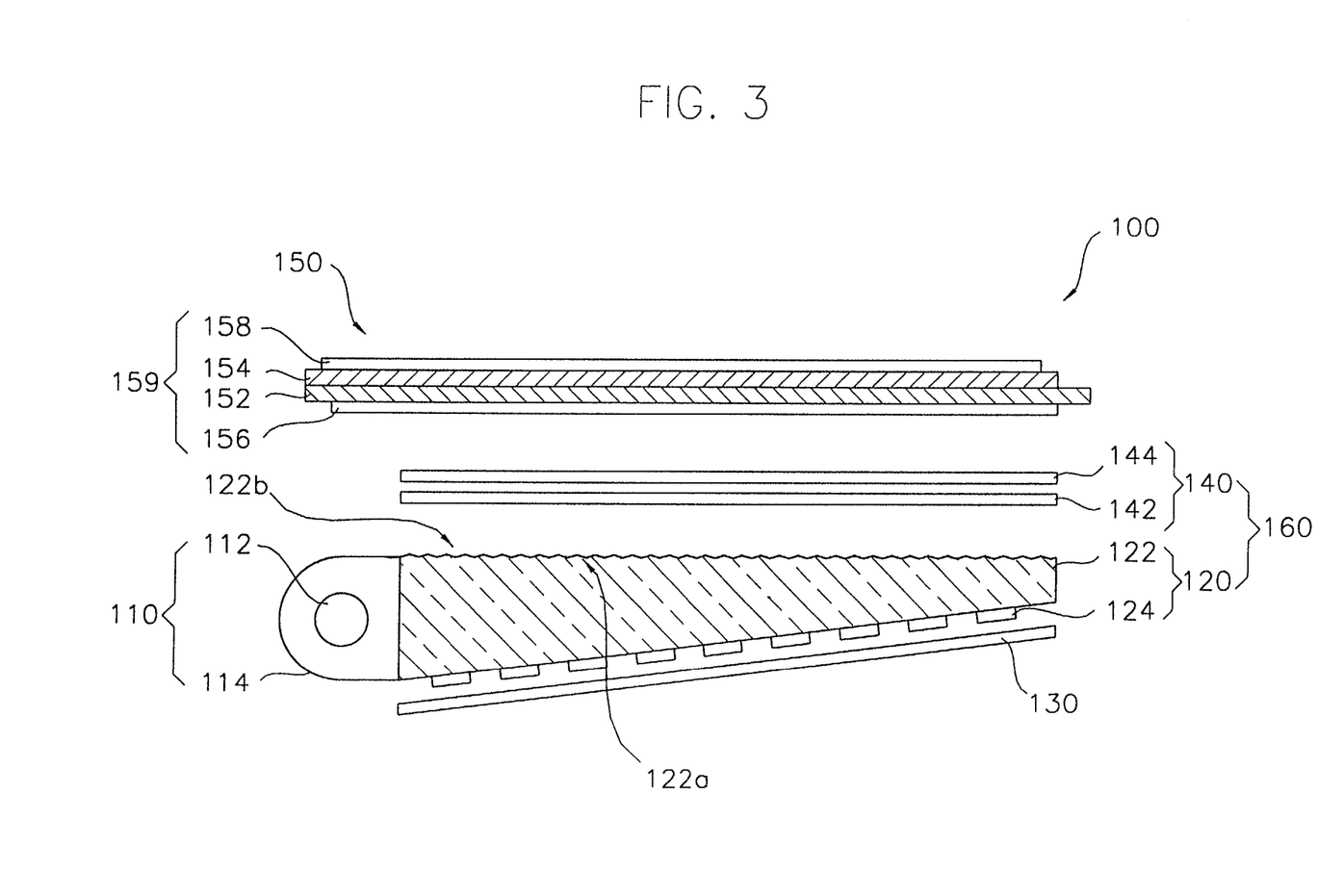
FIG. 3 is a cross sectional view illustrating a structure of a liquid crystal display module according to one embodiment of the present invention.

FIG. 3 is a cross sectional view illustrating a structure of a liquid crystal display (LCD) module according to one embodiment of the present invention.

Referring to FIG. 3, the liquid crystal display module 100 includes a display unit 150 having an LCD panel for displaying an image, and a backlight assembly 160 for emitting a light to the display unit 150.

The display unit 150 includes an LCD panel 159, a data-and-gate printed circuit board (not shown), and a data-and-gate tape carrier package (not shown).

The LCD panel 159 includes a thin film transistor (TFT) substrate 152, a color filter substrate 154, and liquid crystal interposed therebetween (not shown). The LCD panel 159 also includes a lower polarizing plate 156 provided on the TFT substrate 152, and an upper polarizing plate 158 provided on the color filter substrate 154.

The TFT substrate 152 includes a transparent glass on which thin film transistors are formed in a matrix shape. The thin film transistor includes a source terminal connected to a data line, a gate terminal connected to a gate line, and a drain terminal connected to a pixel electrode formed by depositing a transparent conductive material such as indium tin oxide (ITO) thereon.

The color filter substrate 154 is disposed so as to face the TFT substrate 152. The color filter substrate 154 includes RGB pixels which can be formed through a thin film forming process thereon. The RGB pixels display desired colors when a light passes through the RGB pixels. On the entire surface of the color filter substrate 154 is formed a common electrode of ITO.

If the thin film transistor 152 is turned on by applying a power to the gate and source terminals of the transistor, an electric field is generated between the pixel electrode and the common electrode of the color filter substrate 154. An alignment angle of the liquid crystal interposed between the thin film transistor substrate 152 and the color filter substrate 154 is changed by the electric field, and the change of the alignment angle of the liquid crystal causes changes in the light transmittance, thereby obtaining a desired pixel.

The backlight assembly 160 is disposed below the display unit 150 to uniformly supply a light to the display unit 150.

The backlight assembly 160 includes a lamp unit 110 for generating a light, a light guiding plate 122 for guiding the light toward the display unit 150 and changing a path of the light, an optical sheet 140 for making uniform the brightness of the light illuminated from the light guiding plate 122, and a reflecting plate 130 disposed below the light guiding plate 122, for reflecting the light leaked from the light guiding plate 122 toward the light guiding plate 122 to thereby enhance the light transmission efficiency.

The light guiding plate 122 converts a linear light source emitted from the lamp unit 110 into a form of a planar light source, and emits the planar light to the display unit 150. The light guiding plate 122 includes a plurality of printed patterns 124 formed on a bottom surface thereof, for effectively reflecting the light output from the lamp unit 110 toward the display unit 150.

The light guiding plate 122 has a light exit surface 122a of an irregular (or non-uniform) structure 122b (i.e., convex and concave portions) from which the light guided by the light guiding plate and reflected by the reflecting plate 130, is outputted toward the display unit. The light exit surface 122a is non-planarized.

The irregular structure 122b makes uniform the brightness distribution of the light, which is guided by the light guiding plate 122, the printed patterns 124, and the reflecting plate 130. Also, the irregular structure 122b prevents the optical sheet 140 from being adhered to the light guiding plate 122. The irregular surface 122b of light guiding plate 122 is explained with reference to the accompanying drawings.

The optical sheet 140 includes first and second prism sheets 142 and 144 for controlling a path of the light from the light guiding plate 122 in different directions to secure a predetermined visual angle.

Figure 4:
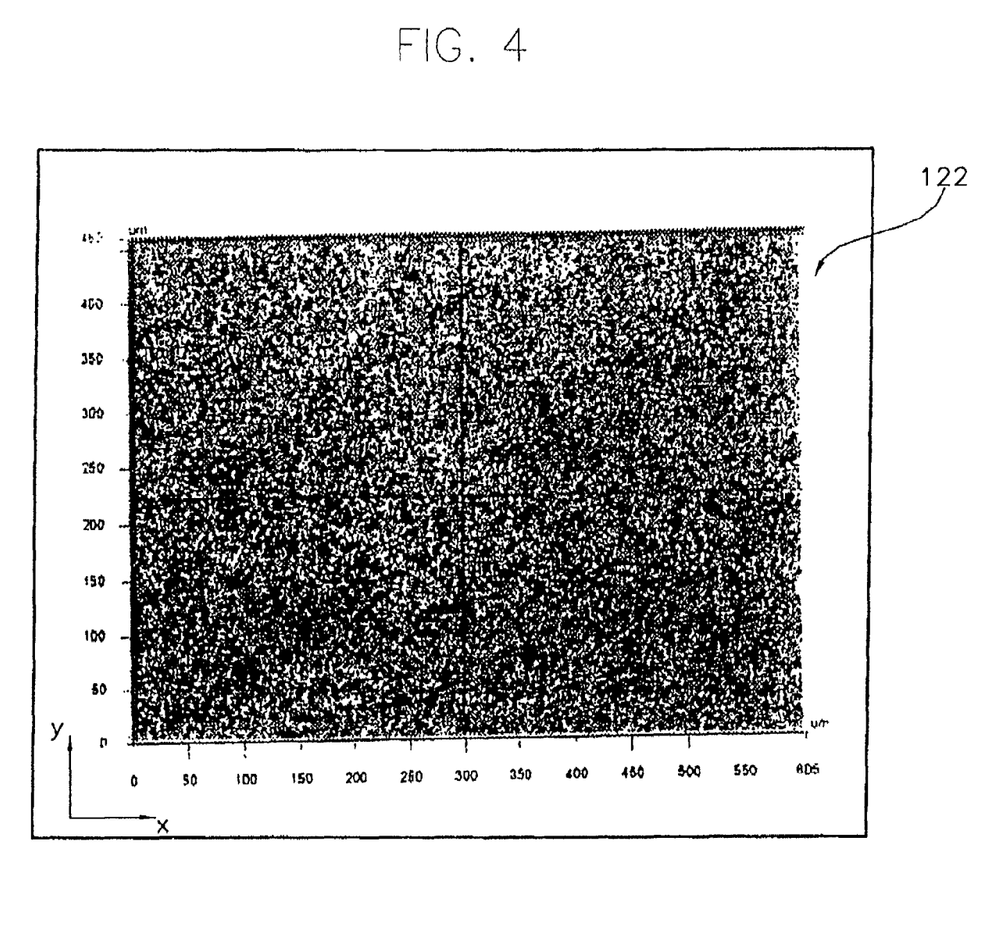
FIGS. 4 and 5 are respectively a top view and a perspective view illustrating structures of a light exit surface of a light guiding plate shown in FIG. 3.
Figure 5:
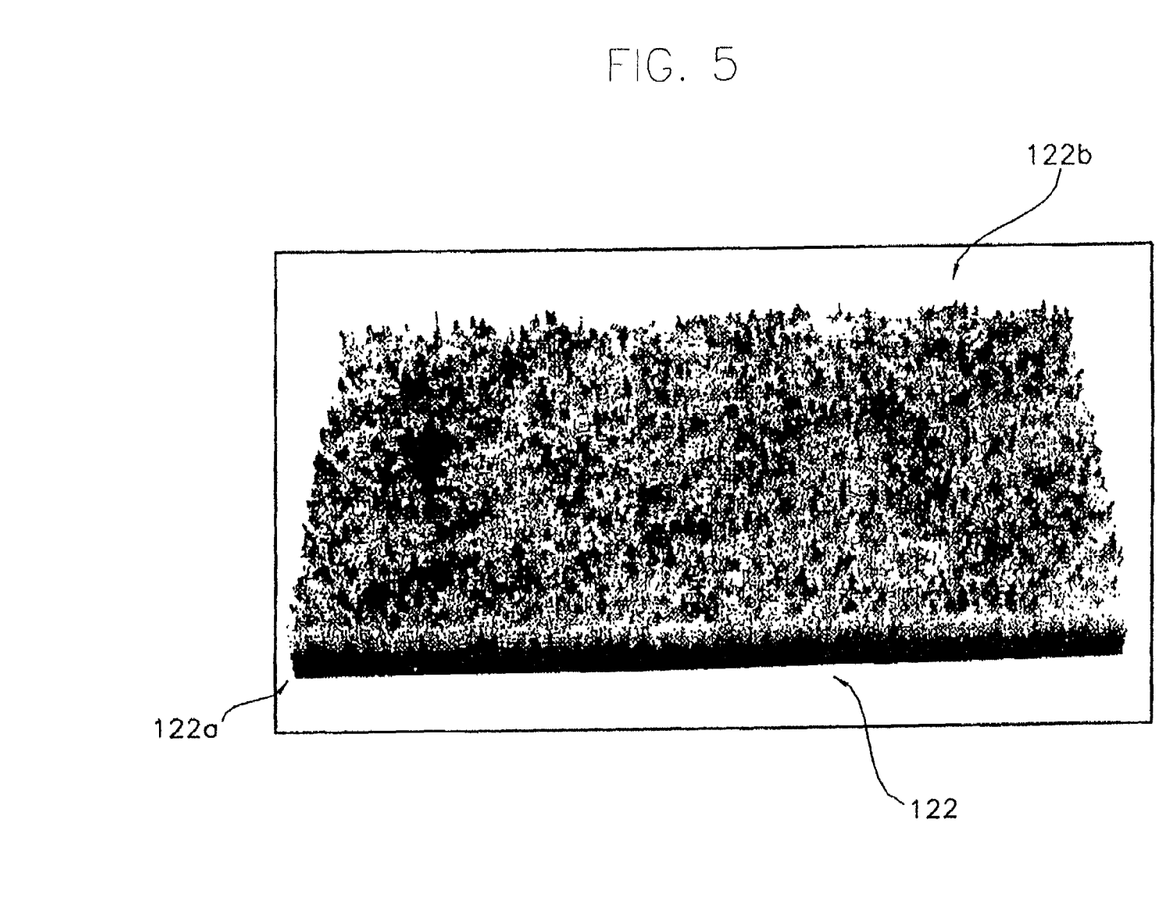

FIGS. 4 and 5 are respectively a plan view and a perspective view illustrating the structure of a light exit surface of a light guiding plate as shown in FIG. 3.

As shown in FIGS. 4 and 5, the light exit surface 122a of the light guiding plate 122 includes a plurality of convex and concave portions 122b.

The convex and concave portions 122b of the light guiding plate 122 can be formed by, for example, a sand blast process, and the process will now be explained.

A workpiece for manufacturing a mold is prepared in a clean room in which the sand blast process is carried out.

If silicon particles are injected onto an entire surface of the workpiece under a high pressure, the silicon particles collide against the surface of the workpiece, thereby forming convex and concave portions on the surface of the workpiece. The silicon particles can be injected through a nozzle to which a desired pressure is applied.

A size, i.e., a height, of a majority of the convex portions formed on the surface of the workpiece is larger than 0.68 µm but less than 1.6 µm. That is, the size of minority of the convex portions formed on the surface of the workpiece may be below 0.68 µm or above 1.6 µm. The term "majority" through out the specification and claims is defined as 50% or more of the total number of convex portions.

For example, by varying a colliding force of the silicon particles against the surface of the workpiece, the height or the amount of the convex portions having a height between 0.68 µm and 1.6 µm can be varied. The colliding force can be controlled, for example, by varying the pressure applied to the nozzle.

If the light guiding plate is injection-molded by using the workpiece having a desired surface roughness as a mold, the light guiding plate 122 having the convex portion of the same size as that of the convex portions formed in the mold can be manufactured as shown in FIG. 5.

Figure 6:
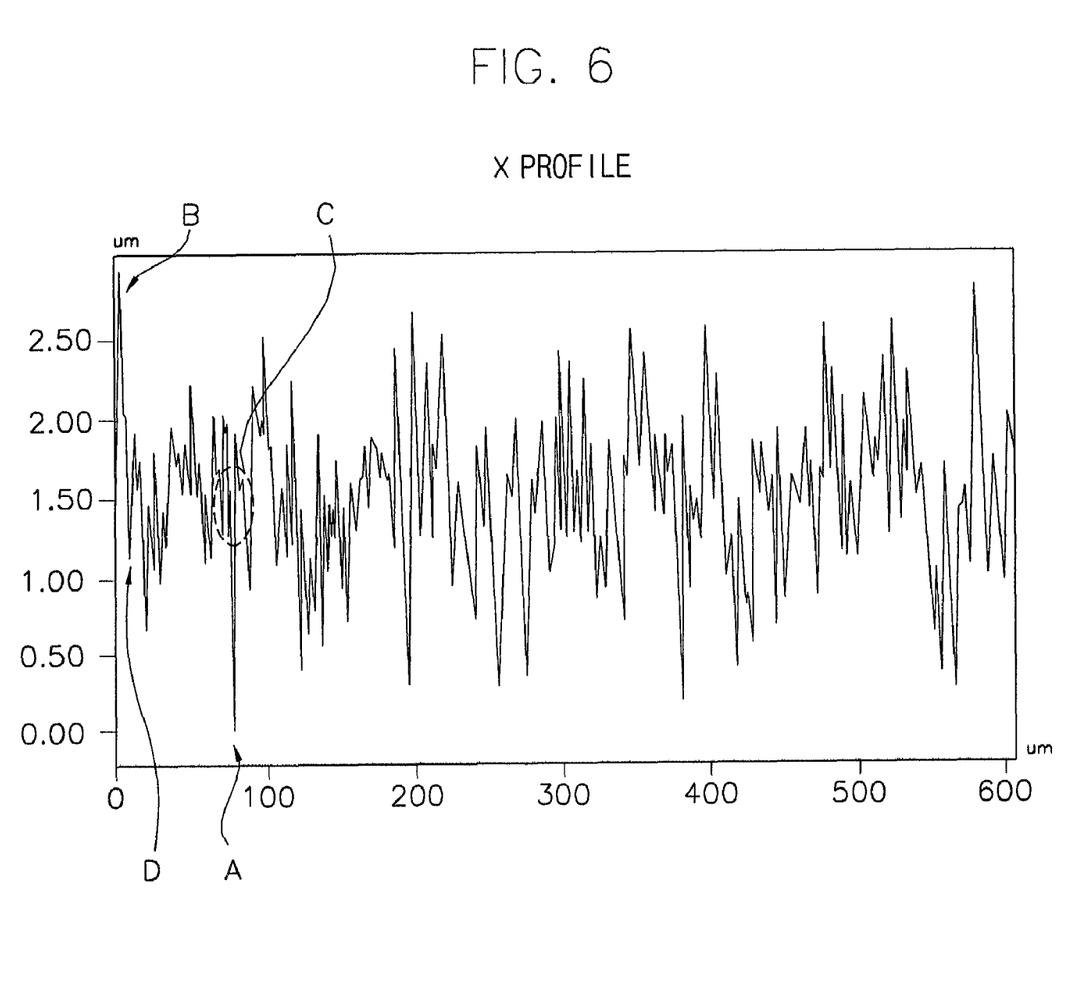
FIG. 6 is a view illustrating a profile of the light guiding plate shown in FIG. 4 taken along an X-axis.
Figure 7:
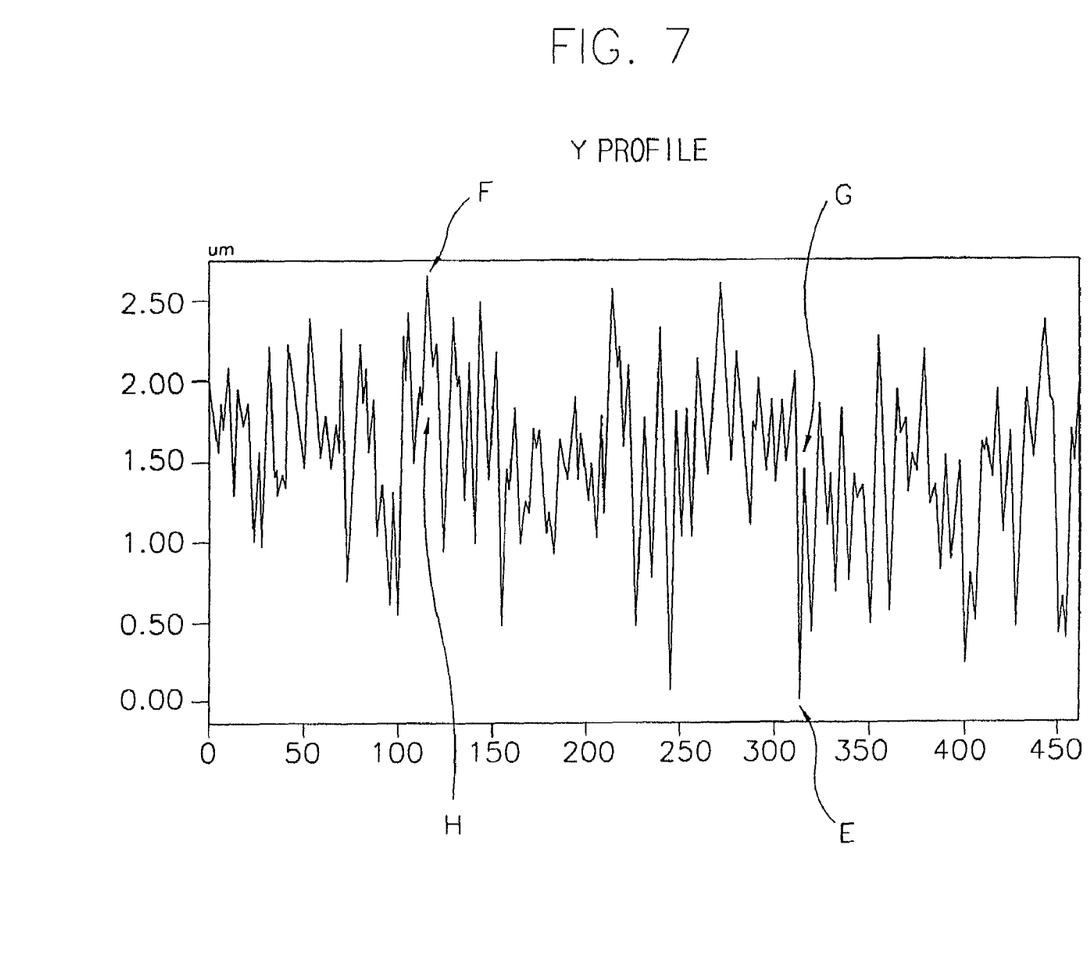
FIG. 7 is a view illustrating a profile of the light guiding plate shown in FIG. 4 taken along a Y-axis.

FIGS. 6 and 7 are views illustrating a profile of the light guiding plate shown in FIG. 4, in which FIG. 6 shows a profile of the light guiding plate shown in FIG. 4 taken along an X-axis, and FIG. 7 shows a profile of the light guiding plate shown in FIG. 4 taken along a Y-axis.

Referring to FIG. 6, assuming that a bottom surface of a first recess 'A' that is the deepest recess in the profile of the X-axis direction is leveled at 0.00 μm, a first convex portion 'B' that is the highest height protruded from the first recess 'A' has a height of approximately 2.78 μm. Specifically, in the profile of the X-axis direction, a maximum deviation between the highest position of the highest convex portion and the lowest position of the first recess is 2.78 μm.

However, as shown in FIG. 6, a protruded height of the convex portion in a first region 'C' adjacent to the first recess 'A' is maintained at 1.50 μm or so, while a depth of the recess of a second region 'D' adjacent to the first convex portion 'B' is maintained at 1.20 μm or so. In other words, the substantially protruded height of the first convex portion 'B' is 1.58 μm, while the protruded height of the convex portion in the first region 'C' is 1.50 μm.

Similarly, referring to FIG. 7, assuming that a bottom surface of a second recess 'E' that is the deepest recess in the profile of the Y-axis direction is 0.00 μm, a second highest convex portion 'F' protruded from the first recess 'E' has a height of approximately 2.65 μm. Specifically, in the profile of the Y-axis direction, a maximum deviation between the highest position of the highest convex portion and the lowest position of the second recess is 2.65 μm.

However, as shown in FIG. 7, a protruded height of the convex portion in a third region 'G' adjacent to the second recess 'E' is maintained at 1.40 μm or so, while a depth of the recess of the fourth region 'H' adjacent to the second convex portion 'F' is maintained at 1.7 μm or so. In other words, the substantially protruded height of the second convex portion 'F' is 0.95 μm, while the protruded height of the convex portion in the third region 'G' is 1.40 μm.

As seen from the X- and Y-axis profiles, a protruded height of the convex portion adjacent to the shallowest recess in the irregular surface 122b is approximately 0.68 μm or more.

As described above, the reasons why the light exit surface 122a of the light guiding plate 122 has the irregular surface 122b of the plurality of convex and concave portions having a specific size are as follows.

As shown in FIG. 3, the LCD module 100 according to one embodiment of the present invention does not employ a separate diffusing plate for scattering the light from the light guiding plate 122 to output the light having uniform brightness distribution.

Specifically, the first prism sheet 142 makes direct contact with an upper surface of the light guiding plate 122 for collecting the light from the light guiding plate 122 in a desired direction to secure a visual angle. On the upper surface of the first prism sheet 142 is disposed a second prism sheet 144 having a different light collecting direction from that of the first prism sheet. The irregular surface 122b formed on the light exit surface 122a of the light guiding plate 122 prevents the light guiding plate 122 from being adhered to the first prism sheet 142.

In addition, the irregular surface 122b controls the light output in the form of planar light source by the light guiding plate 122 to have a uniform brightness distribution.

The control operation of the irregular surface is now explained with reference to table 1 and FIG. 8.

Figure 8:
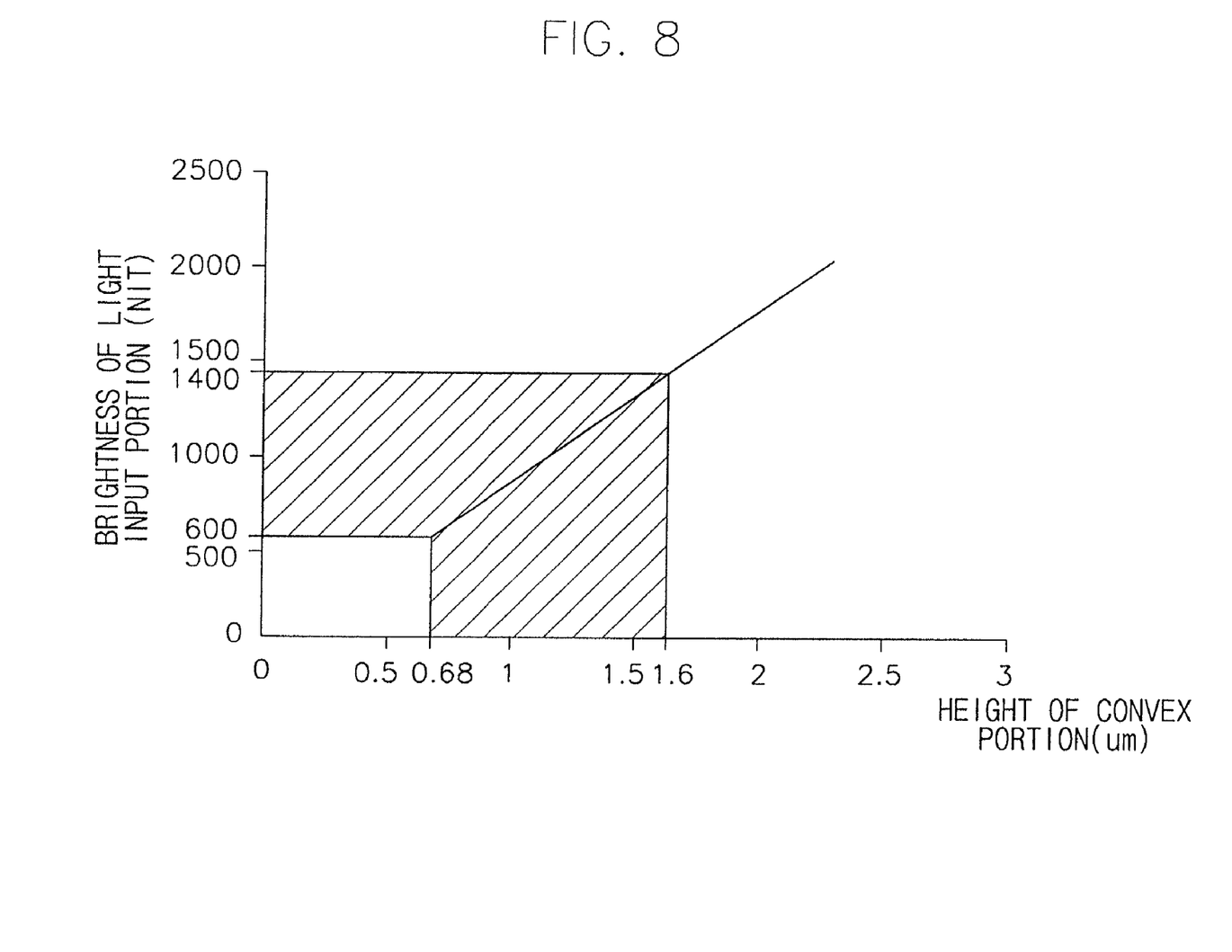
FIG. 8 is a graph illustrating brightness at a light guiding plate according to a height of each convex portion shown in FIG. 5.

Table 1 shows whether or not the adherence occurs between the light guiding plate 122 and the first prism sheet 142 according to the height of the plurality of convex portions 122b, and FIG. 8 shows the brightness at a light receiving surface of the light guiding plate 122 according to the height of the plurality of the convex portions 122b.

As seen from the table 1, in case that the dimension, i.e., the height, of majority of the plurality of convex portions 122b is less than 0.68 μm or equal to, there occurs a phenomenon that the light guiding plate 122 and the first prism sheet 142 are closely adhered to each other. In case that the height of the plurality of convex portions 122b is above 0.68 μm, the light guiding plate 122 is not adhered to the first prism sheet 142.

TABLE 1

|   | Height of convex portion (μm) | Adherence |
| --- | --- | --- |
| 1 | 0.59 | Happen |
| 2 | 0.68 | Happen |
| 3 | 1.05 | No happen |
| 4 | 1.38 | No happen |
| 5 | 1.47 | No happen |
| 6 | 1.64 | No happen |
| 7 | 1.79 | No happen |
| 8 | 2.09 | No happen |

As the height of the plurality of convex portions 122b increases, the adherence between the light guiding plate 122 and the first prism sheet 142 is more effectively prevented.

However, as shown in FIG. 8, if the height of the plurality of convex portions 122b increases, the brightness at the light receiving surface of the light guiding plate 122 also increases. Specifically, if the brightness at the light receiving surface of the light guiding plate increases, a considerable portion of the light incident into the light guiding plate 122 from the lamp unit 110 is leaked at the light receiving surface.

Accordingly, in order to allow the planar light source output from the light guiding plate 122 to have the uniform brightness distribution as a whole, it is preferable to maintain the brightness at the light receiving surface of the light guiding plate 122 at 1400 nit or less. Specifically, in order to prevent the brightness at the light receiving surface of the light guiding plate 122 from being above 1400 nit, it is preferable to maintain the height of the plurality of convex portions 122b below 1.6 μm.

In other words, in order to prevent the light guiding plate from being closely adhered to the first prism sheet 142, preferably, the height of the plurality of convex portions 122b is above 0.68 μm at least. Preferably, the height of the plurality of convex portions 122b for maintaining the brightness at the light receiving surface of the light guiding plate 122 below 1400 nit is below 1.6 μm, if possible.

Meanwhile, although not shown in the accompanying drawings, the display unit 150 and the backlight assembly 160 are sequentially received into a mold frame (not shown) as a receiving container, and a top chassis (not shown) coupled so as to face the mold frame is provided in order to prevent the display unit 150 from being disengaged therefrom.

According to the aforementioned LCD module, throughout the entire surface of the light exit surface of the light guiding plate for converting the linear light source output from the lamp into the form of planar light source, there is provided a plurality of convex portions having a height between 0.68 µm and 1.6 µm. The prism sheet directly facing the plurality of convex portions and for collecting the light output from the light guiding plate is placed on the light guiding plate.

Accordingly, it is possible to uniformly control the brightness distribution of the light output from the light guiding plate, without providing a separate diffusing plate between the light guiding plate and the prism sheet. In addition, since the plurality of convex portions which are integrally formed with the light guiding plate directly faces the prism sheet, the adherence between the light guiding plate and the prism sheet can be prevented.

Therefore, the diffusing plate can be eliminated from the liquid crystal display module, thereby reducing the number of components, and thus minimizing the thickness of the LCD module.

While the present invention has been described in detail with reference to the exemplary embodiments thereof, it should be understood that various changes, substitutions and alterations can be made hereto without departing from the spirit and scope of the invention as defined by the appended claims.

What is claimed is:

1. A liquid crystal display module comprising:
   a lamp that generates a light;
   a light guiding plate that guides the light output from the lamp; and
   an optical sheet that controls a path of the light output from the light guiding plate,
   wherein the light guiding plate includes a plurality of scattered concave and convex portions on a light exit surface of the light guiding plate to prevent the light guiding plate from being adhered to the optical sheet, the scattered concave and convex portions being connected to each other to form a geometrically random profile and being randomly arranged; and
   wherein a majority of the convex portions has a height greater than about 0.68 µm and less than about 1.6 µm.

2. The liquid crystal display module of claim 1, wherein the optical sheet comprises at least one prism sheet for controlling a path of the light output from the light guiding plate.

3. The liquid crystal display module of claim 2, wherein the prism sheet makes direct contact with the light exit surface of the light guiding plate having the concave and convex portions formed thereon.

4. The liquid crystal display module of claim 1, wherein the concave and convex portions are formed by a sand blast process.

5. The liquid crystal display module of claim 1, wherein the light guiding plate includes a light receiving portion for receiving the light generated from the lamp and a brightness at the light receiving portion is from about 600 to about 1400 nit.

6. The liquid crystal display module of claim 1, wherein the light guiding plate is gradually thinner as further advancing from the lamp.

7. The liquid crystal display module of claim 1, wherein the heights of the convex portions are randomly distributed within a predetermined range.

8. The liquid crystal module of claim 1, wherein the convex portions are formed on an entire surface of the light exist surface of the light guiding plate.

9. A liquid crystal display module, comprising:
   a lamp that generates a light;
   a light guiding plate that guides the light output from the lamp; and
   an optical sheet that controls a path of the light output from the light guiding plate,
   wherein the light guiding plate includes a light receiving portion that receives the light generated from the lamp and a light exit surface having a plurality of scattered concave and convex portions, the convex portions preventing the light guiding plate from being adhered to the optical sheet, each of the scattered concave and convex portions being connected to each other to form a geometrically random profile and being randomly arranged; and
   wherein a brightness at the light receiving portion is between about 600 and about 1400 nit and wherein a majority of the convex portions has a height greater than about 0.68 µm and less than about 1.6 µm.

10. The liquid crystal display module of claim 9, wherein the optical sheet comprises at least one prism sheet for controlling a path of the light output from the light guiding plate, the prism sheet making direct contact with the light exit surface having the concave and convex portions formed thereon.

11. The liquid crystal display module of claim 9, wherein the light guiding plate is gradually thinner as further advancing from the lamp.

12. The liquid crystal display module of claim 9, wherein the heights of the convex portions are different from one another with respect to a first direction and a second direction that is in substantially perpendicular to the first direction.

13. The liquid crystal display module of claim 9, wherein the convex portions are formed on an entire surface of the light exit surface of the light guiding plate.

* * * * *